(12) United States Patent
Kako et al.

(10) Patent No.: US 12,166,206 B2
(45) Date of Patent: Dec. 10, 2024

(54) NONAQUEOUS ELECTROLYTE ENERGY STORAGE DEVICE AND ENERGY STORAGE APPARATUS

(71) Applicant: GS Yuasa International Ltd., Kyoto (JP)

(72) Inventors: Tomonori Kako, Kyoto (JP); Masashi Takano, Kyoto (JP); Kenta Uehira, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 862 days.

(21) Appl. No.: 17/258,354

(22) PCT Filed: Jul. 18, 2019

(86) PCT No.: PCT/JP2019/028234
§ 371 (c)(1),
(2) Date: Jan. 6, 2021

(87) PCT Pub. No.: WO2020/017581
PCT Pub. Date: Jan. 23, 2020

(65) Prior Publication Data
US 2021/0296645 A1    Sep. 23, 2021

(30) Foreign Application Priority Data

Jul. 19, 2018   (JP) ................................ 2018-135898

(51) Int. Cl.
*H01M 4/525*   (2010.01)
*H01M 4/02*    (2006.01)
(Continued)

(52) U.S. Cl.
CPC .......... *H01M 4/525* (2013.01); *H01M 4/583* (2013.01); *H01M 10/0569* (2013.01);
(Continued)

(58) Field of Classification Search
None
See application file for complete search history.

(56) References Cited

U.S. PATENT DOCUMENTS

2005/0233218 A1\* 10/2005 Ogawa .............. H01M 10/0436
                                                    429/232
2008/0118833 A1\*  5/2008 Ueda ..................... H01M 4/131
                                                    429/223
(Continued)

FOREIGN PATENT DOCUMENTS

EP    2683004 B1    1/2014
EP    2741355 B1    6/2014
(Continued)

OTHER PUBLICATIONS

Aregai et al. ("Structural, Morphological, Magnetic and Impedance Studies of Layered LiNi1/3Co1/3Mn1/3O2 Cathode Material for Lithium Ion Batteries", Chem Sci Trans., 2017, 6(1), 13-26, DOI: 10.7598/cst2017.1300 ; ISSN:2278-3458) (Year: 2017).\*
(Continued)

*Primary Examiner* — Matthew T Martin
*Assistant Examiner* — Jessie Walls-Murray
(74) *Attorney, Agent, or Firm* — RANKIN, HILL & CLARK LLP

(57) ABSTRACT

An aspect of the present invention is a nonaqueous electrolyte energy storage device including: a positive electrode having a positive composite layer including a positive active material; a negative electrode having a negative composite layer including a negative active material; and a nonaqueous electrolyte including a nonaqueous solvent, in which the positive active material includes a lithium-transition metal composite oxide that contains nickel as a transition metal and has a layered $\alpha$-NaFeO$_2$-type crystal structure, a ratio (N/P) between mass (N) per unit area of the negative active material and mass (P) per unit area of the positive active
(Continued)

material is 0.30 or more and 0.45 or less, the nonaqueous solvent contains PC, DEC, and EMC, a content of the PC in the nonaqueous solvent is 25% by volume or more and 55% by volume or less, a total content of the DEC and the EMC in the nonaqueous solvent is 45% by volume or more and 75% by volume or less, and a content of the DEC is equal to or higher than the content of the EMC.

4 Claims, 1 Drawing Sheet

(51) Int. Cl.
| | | |
|---|---|---|
| *H01M 4/583* | (2010.01) | |
| *H01M 10/0569* | (2010.01) | |
| *H01M 10/44* | (2006.01) | |
| *H01M 10/48* | (2006.01) | |
| *H01M 50/569* | (2021.01) | |

(52) U.S. Cl.
CPC ........... *H01M 10/44* (2013.01); *H01M 10/48* (2013.01); *H01M 50/569* (2021.01); *H01M 2004/027* (2013.01); *H01M 2004/028* (2013.01); *H01M 2300/004* (2013.01)

(56) References Cited

U.S. PATENT DOCUMENTS

| | | | | |
|---|---|---|---|---|
| 2009/0104510 A1* | 4/2009 | Fulop | ................ | H01M 50/553 |
| | | | | 429/50 |
| 2009/0181311 A1 | 7/2009 | Iwanaga et al. | | |
| 2009/0305143 A1* | 12/2009 | Matsuno | ................ | H01M 4/13 |
| | | | | 429/207 |
| 2012/0288759 A1* | 11/2012 | Nagai | ................ | H01M 4/13 |
| | | | | 429/211 |
| 2013/0288085 A1 | 10/2013 | Morikawa et al. | | |
| 2014/0011091 A1* | 1/2014 | Endo | ................ | H01M 4/583 |
| | | | | 429/223 |
| 2014/0234714 A1 | 8/2014 | Cho et al. | | |
| 2016/0315351 A1 | 10/2016 | Kotou et al. | | |
| 2018/0062204 A1 | 3/2018 | Takahashi et al. | | |

FOREIGN PATENT DOCUMENTS

| | | |
|---|---|---|
| EP | 2772981 B1 | 9/2014 |
| JP | 10-284060 A | 10/1998 |
| JP | 2000-299939 A | 10/2000 |
| JP | 2002-305026 A | 10/2002 |
| JP | 2005-243448 A | 9/2005 |
| JP | 2005-317469 A | 11/2005 |
| JP | 2009-301983 A | 12/2009 |
| JP | 2010-135190 A | 6/2010 |
| JP | 2011-233245 A | 11/2011 |
| JP | 2014-157817 A | 8/2014 |
| JP | 2015-162441 A | 9/2015 |
| JP | 2016-189305 A | 11/2016 |
| JP | 2017-157347 A | 9/2017 |
| WO | 2007/139130 A1 | 12/2007 |
| WO | 2015/093091 A1 | 6/2015 |
| WO | 2016/117279 A1 | 7/2016 |

OTHER PUBLICATIONS

Jafari et al. ("Nanoporous hard carbon microspheres as anode active material of lithium ion battery", Electrochimica Acta, vol. 203, Jun. 10, 2016, pp. 9-20, <https://doi.org/10.1016/j.electacta.2016.03.028>) (Year: 2016).*

International Search Report (ISR) dated Oct. 1, 2019 filed in PCT/JP2019/028234.

* cited by examiner

US 12,166,206 B2

NONAQUEOUS ELECTROLYTE ENERGY STORAGE DEVICE AND ENERGY STORAGE APPARATUS

TECHNICAL FIELD

The present invention relates to a nonaqueous electrolyte energy storage device and an energy storage apparatus.

BACKGROUND ART

Nonaqueous electrolyte secondary batteries typified by lithium ion secondary batteries have been frequently used for electronic devices such as personal computers and communication terminals, automobiles, and the like, because the batteries are high in energy density. The nonaqueous electrolyte secondary batteries each typically include a pair of electrodes electrically isolated by a separator and a nonaqueous electrolyte interposed between the electrodes, and the batteries are configured to be charged and discharged by ion transfer between the both electrodes. In addition, capacitors such as lithium ion capacitors and electric double layer capacitors have been widely used as nonaqueous electrolyte energy storage devices besides nonaqueous electrolyte secondary batteries.

The positive electrodes and the negative electrodes of such nonaqueous electrolyte energy storage devices each contain therein an active material that occludes and releases lithium ions. Although graphite is commonly used as the negative active material, energy storage devices with non-graphitic carbon such as hard carbon used have also been developed (see Patent Documents 1 and 2).

PRIOR ART DOCUMENTS

Patent Documents

Patent Document 1: JP-A-2015-162441
Patent Document 2: JP-A-10-284060

SUMMARY OF THE INVENTION

Problems to be Solved by the Invention

As one of methods for reducing the size of the energy storage device, it is conceivable that a negative composite layer including the negative active material is provided thinly. In this case, the mass of the negative active material in the negative composite layer is relatively lower than the mass of the positive active material in the positive composite layer. In this regard, in order to secure the electric capacity of the energy storage device while reducing the thickness of the negative composite layer, there is a need for the insertion of the charge carrier (for example, lithium ions in a lithium ion secondary battery) per unit mass of the negative active material to be increased by expanding the potential range of using the negative active material. In the case where non-graphitic carbon is used, however, the increased insertion of the charge carrier per unit mass of the non-graphitic carbon makes the negative electrode potential more likely to become electronegative during charge. When the negative electrode potential shifts toward the electronegative side during charge, the nonaqueous electrolyte is more likely to be reductively decomposed in the negative electrode, thereby causing a disadvantage of decreased durability. Specifically, the capacity retention ratio tends to decrease significantly with charge-discharge repeated.

Furthermore, depending on the type of the nonaqueous solvent for use in the energy storage device, a sudden rise in temperature may occur when the energy storage device is overcharged due to unintended use or the like. For the energy storage device, such a rise in temperature during overcharge is desirably suppressed from viewpoints such as suppressed quality deterioration and reliability.

The present invention has been made based on the foregoing circumstances, and an object thereof is to provide a nonaqueous electrolyte energy storage device that is relatively small in mass per unit area of a negative active material containing non-graphitic carbon, with excellent durability and a suppressed rise in temperature during overcharge, and an energy storage apparatus including such a nonaqueous electrolyte energy storage device.

Means for Solving the Problems

One aspect of the present invention made in order to solve the problems mentioned above is a nonaqueous electrolyte energy storage device including: a positive electrode having a positive composite layer including a positive active material; a negative electrode having a negative composite layer including a negative active material; and a nonaqueous electrolyte including a nonaqueous solvent, in which the positive active material includes a lithium-transition metal composite oxide that contains nickel as a transition metal and has a layered α-NaFeO$_2$-type crystal structure, the negative active material contains non-graphitic carbon, a ratio (N/P) between mass (N) per unit area of the negative active material in the negative composite layer and mass (P) per unit area of the positive active material in the positive composite layer is 0.30 or more and 0.45 or less, the nonaqueous solvent contains a propylene carbonate, a diethyl carbonate, and an ethyl methyl carbonate, a content of the propylene carbonate in the nonaqueous solvent is 25% by volume or more and 55% by volume or less, a total content of the diethyl carbonate and the ethyl methyl carbonate in the nonaqueous solvent is 45% by volume or more and 75% by volume or less, and a content of the diethyl carbonate is equal to or higher than the content of the ethyl methyl carbonate.

Another aspect of the present invention made in order to solve the problems mentioned above is an energy storage apparatus including the energy storage device, a detection unit configured to detect a voltage of the energy storage device, and a control unit electrically connected to the detection unit, and configured to stop the energy storage device from being charged with electricity when the voltage is equal to or higher than a predetermined value, in which the negative electrode has a potential of 0.01 V (vs. Li/Li$^+$) or lower when the voltage of the energy storage device is the predetermined value.

Advantages of the Invention

According to the present invention, it is possible to provide a nonaqueous electrolyte energy storage device that is relatively small in mass per unit area of a negative active material containing non-graphitic carbon, with excellent durability and a suppressed rise in temperature during overcharge, and an energy storage apparatus including such a nonaqueous electrolyte energy storage device.

MODE FOR CARRYING OUT THE INVENTION

Figure 1:
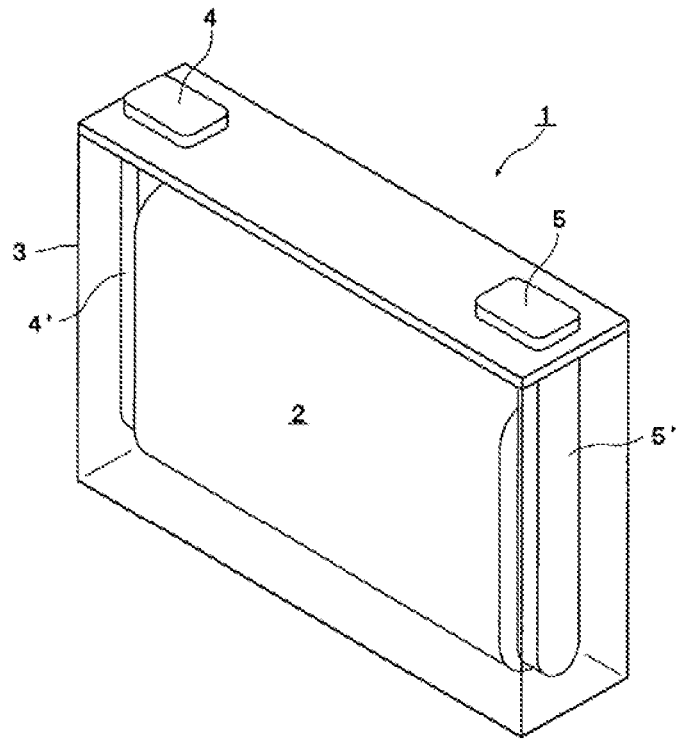
FIG. 1 is an external perspective view illustrating a nonaqueous electrolyte secondary battery according to an embodiment of a nonaqueous electrolyte energy storage device according to the present invention.

A nonaqueous electrolyte energy storage device according to an embodiment of the present invention is a nonaqueous electrolyte energy storage device including: a positive electrode having a positive composite layer including a positive active material; a negative electrode having a negative composite layer including a negative active material; and a nonaqueous electrolyte including a nonaqueous solvent, in which the positive active material includes a lithium-transition metal composite oxide that contains nickel as a transition metal and has a layered $\alpha$-NaFeO$_2$-type crystal structure, the negative active material contains non-graphitic carbon, a ratio (N/P) between mass (N) per unit area of the negative active material in the negative composite layer and mass (P) per unit area of the positive active material in the positive composite layer is 0.30 or more and 0.45 or less, the nonaqueous solvent contains a propylene carbonate (PC), a diethyl carbonate (DEC), and an ethyl methyl carbonate (EMC), a content of the PC in the nonaqueous solvent is 25% by volume or more and 55% by volume or less, a total content of the DEC and the EMC in the nonaqueous solvent is 45% by volume or more and 75% by volume or less, and a content of the DEC is equal to or higher than the content of the EMC.

The nonaqueous electrolyte energy storage device is a nonaqueous electrolyte energy storage device that is relatively small in mass per unit area of the negative active material containing non-graphitic carbon, and at the same time, has excellent durability and a high capacity retention ratio after a charge-discharge cycle. Furthermore, the nonaqueous electrolyte energy storage device is capable of suppressing a rise in temperature during overcharge. The reason why the nonaqueous electrolyte energy storage device achievers the above-mentioned effect is not to be construed in a particularly limited manner, but the following reasons are presumed, for example. The durability is improved by using, as a nonaqueous solvent, PC and DEC in combination at a specific compositional ratio. The reasons therefor are presumed to be that these nonaqueous solvents are excellent in resistance to reductive decomposition, and that in the case of DEC, ethane is produced even in the case where the DEC is reductively decomposed, and incorporated into the film and the like, thus making the internal pressure less likely be increased. On the other hand, in the case where the chain carbonate is only DEC, the DEC reacts with the charge carrier such as metallic lithium during overcharge, thereby making heat more likely to be generated. In contrast, the combined use of DEC and EMC as the chain carbonate is capable of suppressing a rise in temperature during overcharge. Furthermore, the mixing ratios of PC, DEC, and EMC as the nonaqueous solvent within a predetermined range make it possible to achieve both durability and a suppressed rise in temperature in a balanced manner.

The term "non-graphitic carbon" herein refers to a carbonaceous material in which the average lattice spacing ($d_{002}$) of the (002) plane, measured from X-ray diffractometry before charge-discharge or in a discharge state, is 0.34 nm or more (for example, 0.34 nm or more and 0.42 nm or less). Further, the term "discharge state" as used herein refers to the fact that the open circuit voltage is 0.7 V or higher in a single-electrode battery with each of: as a working electrode, the negative electrode including the carbonaceous material as a negative active material: and as a counter electrode, metallic lithium. More specifically, the potential of the counter electrode of metallic lithium in the state of the open circuit is substantially equal to the oxidation-reduction potential of lithium, the open circuit voltage is thus approximately equal to the potential of the negative electrode including the carbonaceous material with respect to the oxidation-reduction potential of lithium, and the open circuit voltage of 0.7 V or higher means that the potential of the negative electrode is 0.7 V (vs. Li/Li$^+$) or higher, thereby causing occludable and releasable lithium ions to be sufficiently released with charge-discharge from the carbonaceous material that serves as a negative active material. In addition, the mass (P) per unit area of the positive active material in the positive composite layer has a value obtained by dividing the mass of the positive active material in the positive composite layer by the area of the positive electrode composite layer (the area of the surface with the positive composite layer stacked thereon, typically, the area of the surface where the positive composite layer and the positive electrode substrate are overlapped directly or with an intermediate layer interposed therebetween). More specifically, the mass (P) refers to the coating amount per unit area of the positive active material in the case where the positive composite layer is formed by coating. The same applies to the mass (N) per unit area of the negative active material in the negative composite layer.

The positive electrode and the negative electrode are preferably wound. In the case where a positive electrode and a negative electrode are wound, the positive electrode and the negative electrode have curved parts produced, and thus, the conventional energy storage device is likely to have durability decreased. For this reason, in the case where the positive electrode and the negative electrode are wound for the nonaqueous electrolyte energy storage device, the effects of the present invention such as excellent durability can be more sufficiently obtained.

An energy storage apparatus according to an embodiment of the present invention is an energy storage apparatus including the energy storage device, a detection unit configured to detect a voltage of the energy storage device, and a control unit electrically connected to the detection unit, and configured to stop the energy storage device from being charged with electricity when the voltage is equal to or higher than a predetermined value, in which the negative electrode has a potential of 0.01 V (vs. Li/Li$^+$) or lower when the voltage of the energy storage device is the predetermined value.

The energy storage apparatus is configured to be chargeable until the negative electrode potential reaches 0.01 V (vs. Li/L$^+$) or lower. Typically, in such an energy storage apparatus, the nonaqueous electrolyte is more likely to reductively decomposed in the negative electrode during charge, thus making the durability more likely to be decreased. The energy storage apparatus, however, includes the nonaqueous electrolyte energy storage device according to an embodiment of the present invention, and thus has excellent durability and a high capacity retention ratio after a charge-discharge cycle. Furthermore, for the energy storage apparatus, a specific nonaqueous solvent is used, thus also suppressing a rise in temperature during overcharge.

A nonaqueous electrolyte energy storage device (hereinafter, also referred to simply as an "energy storage device")

and an energy storage apparatus according to an embodiment of the present invention will be described below in detail. An embodiment of the present invention will be described below with reference to a case of applying the present invention to a lithium ion secondary battery as an example, but is not intended to limit the application target of the present invention.

<Nonaqueous Electrolyte Energy Storage Device>

The energy storage device according to one embodiment of the present invention includes a positive electrode, a negative electrode, and a nonaqueous electrolyte. A nonaqueous electrolyte secondary battery will be described below as an example of an energy storage device. The positive electrode and the negative electrode typically form an electrode assembly with the positive and negative electrodes alternated by stacking or winding with a separator interposed therebetween. The positive electrode and the negative electrode are preferably wound. The electrode assembly in the wound form has, for example, has a shape obtained by winding, with the width direction as an axis, a layered product composed of respectively strip-shaped positive electrode, first separator, negative electrode, and second separator stacked in this order. The electrode assembly is housed in a battery case, and the battery case is filled with the nonaqueous electrolyte mentioned above. The nonaqueous electrolyte is interposed between the positive electrode and the negative electrode. In addition, as the battery case, a known metallic battery case, a resin battery case, or the like can be used, which is typically used as a battery case of a nonaqueous electrolyte secondary battery.

(Positive Electrode)

The positive electrode has a positive electrode substrate and a positive composite layer disposed on the positive electrode substrate directly or with an intermediate layer interposed therebetween. The intermediate layer and the positive composite layer may be provided on each surface of the strip-shaped or plate-shaped positive electrode substrate.

The positive electrode substrate has conductivity. As the material of the substrate, a metal such as aluminum, titanium, tantalum, and stainless steel, or an alloy thereof is used. Among these materials, aluminum and aluminum alloys are preferable from the viewpoint of the balance among potential resistance, high conductivity, and cost. In addition, examples of the form of the positive electrode substrate include a foil and a vapor deposition film, and the foil is preferable in terms of cost. More specifically, the positive electrode substrate is preferably an aluminum foil. Further, examples of the aluminum or aluminum alloy can include A1085P and A3003P specified in JIS-H-4000 (2014).

The intermediate layer, which serves as a coating layer on the surface of the positive electrode substrate, includes conductive particles such as carbon particles, thereby reducing the contact resistance between the positive electrode substrate and the positive composite layer. The structure of the intermediate layer is not particularly limited, and can be formed from, for example, a composition containing a resin binder and conductive particles. It is to be noted that, having "conductivity" means that the volume resistivity measured in accordance with JIS-H-0505 (1975) is 107 Ω·cm or less, and "non-conductivity" means that the volume resistivity is more than 107 Ω·cm.

The positive composite layer is formed from a so-called positive composite containing a positive active material. In addition, the positive composite that forms the positive composite layer contains optional components such as a conductive agent, a binder (binder), a thickener, and a filler, if necessary.

The positive active material contains a lithium-transition metal composite oxide containing at least lithium (Li) and nickel (Ni) as constituent elements. The lithium-transition metal composite oxide contains nickel as a transition metal, and has a layered α-NaFeO$_2$-type (that is, an X-ray diffraction pattern that can belong to the space group R3-m) crystal structure. Suitable examples of the lithium-transition metal composite oxide disclosed herein include a lithium-nickel-cobalt-manganese composite oxide (NCM) containing cobalt (Co) and manganese (Mn) as constituent elements besides Li and Ni. Preferable is a lithium-nickel-cobalt-manganese composite oxide containing, among these transition metal elements, Ni as a main component, or Ni, Co, and Mn in approximately the same proportions. In this regard, the lithium-nickel-cobalt-manganese transition metal composite oxide containing Ni as a main component refers to a lithium-transition metal composite oxide in which Ni accounts for 50 mol % or more (for example, 60 mol % or more) of the total number of moles of the transition metal elements contained in the composite oxide. The technique disclosed herein can be preferably implemented in an aspect in which Ni accounts for 50 mol % or more of the total number of moles of transition metal elements in the lithium-nickel-cobalt-manganese transition metal composite oxide.

Preferable are, among the positive active materials mentioned above, lithium-transition metal composite oxides (for example, a lithium-nickel-cobalt-manganese composite oxide) represented by $Li_xNi_aCo_bMn_cM_dO_e$ (M is at least one transition metal other than Ni, Co, and Mn, with $0<x\leq1.3$, $a+b+c+d=1$, $0<a\leq1$, $0\leq b\leq1$, $0\leq c\leq1$, $0\leq d\leq1$, and $1.7\leq e\leq2.3$).

In the lithium-transition metal composite oxide represented by $Li_xNi_aCo_bMn_cM_dO_e$ mentioned above, x is preferably 1 or more, and may be 1. a is more than 0, and more preferably 0.3 or more. From viewpoints such as increasing the energy density of the battery, a is further preferably ⅓ or more, and may be further preferably 0.5 or more (for example, 0.6 or more, and typically 0.8 or more) in some cases. In addition, a is preferably less than 1. From viewpoints such as better producing the effects described above, a is preferably 0.9 or less, and more preferably 0.8 or less. In some aspects, a may be, for example, 0.6 or less, and typically 0.5 or less. From viewpoints such as better producing the effects described above, b is preferably more than 0, and more preferably 0.05 or more. In some aspects, b may be 0.1 or more, 0.2 or more, or 0.3 or more. From viewpoints such as increasing the energy density of the battery, b is preferably less than 1, and more preferably 0.5 or less. In some aspects, b may be ⅓ or less, 0.2 or less, or 0.1 or less. From viewpoints such as better producing the effects described above, c is preferably more than 0, and more preferably 0.05 or more. In some aspects, c may be 0.1 or more, 0.2 or more, or 0.3 or more. Furthermore, from viewpoints such as increasing the energy density of the battery, c is preferably less than 1, and more preferably 0.5 or less. In some aspects, c may be ⅓ or less, 0.2 or less, or 0.1 or less. d is preferably 0.1 or less, and may be substantially 0. e is a value determined to satisfy the charge neutral condition with $1.7\leq e\leq2.3$, and may be substantially 2. In a preferred aspect, a meets $0.3\leq a\leq0.9$ (for example, ⅓≤a≤0.8), b meets $0.05\leq b\leq0.4$ (for example, $0.1\leq b\leq⅓$), and c meets $0.05\leq c\leq0.4$ (for example, $0.1\leq b\leq⅓$). Within such ranges of a, b, and c, a balance can be achieved at a higher level between the increased energy density and improved durability of the battery.

Examples of the lithium-metal composite oxides represented by the above-mentioned chemical composition of $Li_xNi_aCo_bMn_cM_dO_e$ include $LiNi_{1/3}Co_{1/3}Mn_{1/3}O_2$, $LiNi_{3/5}Co_{1/5}Mn_{1/5}O_2$, $LiNi_{1/2}Co_{1/5}Mn_{3/10}O_2$, $LiNi_{1/2}Co_{3/10}Mn_{1/5}O_2$, $LiNi_{8/10}Co_{1/10}Mn_{1/10}O_2$, $LiNi_{1/6}Co_{1/6}Mn_{2/3}O_2$, $LiNi_{1/6}Co_{2/3}Mn_{1/6}O_2$, and $LiCoO_2$. It is to be noted that the chemical formula that represents the lithium-transition metal composite oxide mentioned above is considered to show the composition in the state before the first charge treatment (that is, the charge treatment performed first after assembling battery constituent elements such as a positive electrode, a negative electrode, and an electrolyte).

In the positive composite layer, one of the positive active materials described above may be used alone, or two or more thereof may be used in mixture. Above all, the positive active material preferably contains the lithium-metal composite oxides represented by $Li_xNi_aCo_bMn_cM_dO_e$ mentioned above in a proportion of 50% by mass or more (typically 50% by mass or more and 100% by mass or less, for example, 70% by mass or more and 100% by mass or less, and preferably 80% by mass or more and 100% by mass or less) of the total positive active material used, and a positive active material is more preferable that consists essentially of the lithium-metal composite oxides represented by $Li_xNi_aCo_bMn_cM_dO_e$ mentioned above.

The content of the positive active material in the positive composite layer is not particularly limited, but the lower limit thereof is preferably 50% by mass, more preferably 80% by mass, and further preferably 90% by mass. On the other hand, the upper limit of this content is preferably 99% by mass, and more preferably 98% by mass.

The conductive agent is not particularly limited as long as the agent is a conductive material that has no adverse effect on the performance of the energy storage device. Examples of such a conductive agent include natural or artificial graphite; carbon black such as furnace black, acetylene black, and ketjen black; metals; and conductive ceramics. Examples of the conductive agent form include a powder form and fibrous form. In the case of using the conductive agent, the proportion of the conductive agent to the whole positive composite layer can be approximately 1.0% by mass or more and 20% by mass or less, and typically, is preferably approximately 2.0% by mass or more and 15% by mass or less (for example, 3.0% by mass or more and 6.0% by mass or less).

Examples of the binder (binder) include thermoplastic resins such as fluororesins (polytetrafluoroethylene (PTFE), polyvinylidene fluoride (PVDF), and the like), polyethylene, polypropylene, and polyimide; elastomers such as an ethylene-propylene-diene rubber (EPDM), sulfonated EPDM, a styrene-butadiene rubber (SBR), and fluororubbers; and polysaccharide polymers. In the case of using the binder, the proportion of the binder to the whole positive composite layer can be approximately 0.50% by mass or more and 15% by mass or less, and typically, is preferably approximately 1.0% by mass or more and 10% by mass or less (for example, 1.5% by mass or more and 3.0% by mass or less).

Examples of the thickener include polysaccharide polymers such as carboxymethyl cellulose (CMC) and methyl cellulose. In addition, in the case where the thickener has a functional group that reacts with lithium, this functional group is preferably deactivated in advance by methylation or the like. In the case of using the thickener, the proportion of the thickener to the whole positive composite layer can be approximately 8% by mass or less, and typically, is preferably approximately 5.0% by mass or less (for example, 1.0% by mass or less). The technique disclosed herein can be preferably implemented in an aspect in which the positive composite layer contains no thickener mentioned above.

The filler is not particularly limited as long as the filler has no adverse effect on the battery performance. Examples of the main component of the filler include polyolefins such as polypropylene and polyethylene, silica, alumina, zeolite, and glass. In the case of using the filler, the proportion of the filler to the whole positive composite layer can be approximately 8.0% by mass or less, and typically is preferably approximately 5.0% by mass or less (for example, 1.0% by mass or less). The technique disclosed herein can be preferably implemented in an aspect in which the positive composite layer contains no filler mentioned above.

The upper limit of the porosity of the positive composite layer is preferably 40%, and more preferably 35%. On the other hand, the lower limit of the porosity is preferably 20%, and more preferably 25%. The porosity of the positive composite layer within the range mentioned above makes it possible to produce favorable highly filled state and ionic diffusivity in a well-balanced manner.

It is to be noted that the "porosity" of the positive composite layer refers to a value calculated by the following formula from the true density and filling density of the positive composite layer, calculated from the true densities of the respective components constituting the positive composite layer. The filling density refers to a value obtained by dividing the mass of the positive composite layer by the apparent volume of the positive composite layer. The apparent volume refers to a volume including voids, and can be obtained as a product of the thickness and the area in the case of the positive composite layer. It is to be noted that the same applies to the porosity of the negative composite layer described later.

Porosity (%)=100−(Filling Density/True Density)×100

The lower limit of amount of the positive composite layer stacked (the mass per unit area of the positive composite layer in the positive electrode) is preferably 0.5 g/100 cm$^2$, more preferably 1 g/100 cm$^2$, and further preferably 1.5 g/100 cm$^2$. On the other hand, the upper limit of the amount stacked is preferably 4 g/100 cm$^2$, more preferably 3 g/100 cm$^2$, and further preferably 2 g/100 cm$^2$.

The mass (P) per unit area of the positive active material in the positive composite layer is not particularly limited as long as the ratio by mass (N/P) satisfies the range mentioned above, but the lower limit thereof is preferably 0.5 g/100 cm$^2$, more preferably 1 g/100 cm$^2$, and further preferably 1.5 g/100 cm$^2$. On the other hand, the upper limit of this mass (P) is preferably 4 g/100 cm$^2$, more preferably 3 g/100 cm$^2$, and further preferably 2 g/100 cm$^2$.

(Negative Electrode)

The negative electrode has a negative electrode substrate and a negative composite layer disposed on the negative electrode substrate directly or with an intermediate layer interposed therebetween. The intermediate layer and the negative composite layer may be provided on each surface of the strip-shaped or plate-shaped negative electrode substrate. The intermediate layer may have the same structure as the intermediate layer of the positive electrode. Further, the negative electrode may be further provided with a coating layer laminated on the surface of the negative composite layer, or may be provided with no coating layer. The coating layer may be a layer referred to as an overcoat layer, an insulating layer, or the like.

While the negative electrode substrate may have the same configuration as the positive electrode substrate, a metal such as copper, nickel, stainless steel, nickel plated-steel, or an alloy thereof is used as the material of the negative electrode substrate, and copper or a copper alloy is preferable. More specifically, copper foil is preferable as the negative electrode substrate. Examples of the copper foil include rolled copper foil and electrolytic copper foil.

The negative composite layer mentioned above is formed of a so-called negative electrode mixture containing a negative active material. More specifically, the negative composite layer is a negative composite formed in a layer. Further, the negative composite that forms the negative composite layer contains optional components such as a conductive agent, a binder (binder), a thickener, and a filler, if necessary. As the optional components such as a conductive agent, a binder (binder), a thickener, and a filler, the same components as those for the positive composite layer can be used.

The negative active material contains non-graphitic carbon (typically particulate). Examples of the non-graphitic carbon include non-graphitizable carbon (hard carbon), graphitizable carbon (soft carbon), and amorphous carbon (amorphous carbon). Examples of the non-graphitizable carbon include a phenolic resin fired body, a furan resin fired body, a furfuryl alcohol resin fired body, a coal tar fired body, a coke fired body, and a plant fired body. Examples of the graphitizable carbon include coke and pyrolytic carbon.

The non-graphitic carbon preferably contains non-graphitizable carbon. The use of non-graphitizable carbon more effectively produces the effect of using the above-described PC, DEC and EMC in combination so as to have specific compositional ratios (for example, the effect of increasing the capacity retention ratio after cycling), thereby, for example, allowing durability to be enhanced. The content of the non-graphitizable carbon in the non-graphitic carbon is not particularly limited, but the lower limit thereof is about 50% by mass, preferably 70% by mass, more preferably 90% by mass, and further preferably 99% by mass. This upper limit may be 100% by weight. It is to be noted that in this specification, the term "non-graphitizable carbon" is a carbonaceous material in which the average lattice spacing ($d_{002}$) of the (002) plane, measured from X-ray diffractometry before charge-discharge or in the discharge state, is 0.36 nm or more (for example, 0.36 nm or more and 0.42 nm or less), and refers to, among types of non-graphitic carbon, non-graphitic carbon that is less likely to produce a graphite structure that has a three-dimensional stacking regularity (for example, less likely to be converted to graphite even by heating to an ultrahigh temperature around 3300 K under normal pressure). Further, the term "graphitizable carbon" is a carbonaceous material in which the above-mentioned average lattice spacing ($d_{002}$) is 0.34 nm or more and less than 0.36 nm, and refers to, among types of non-graphitic carbon, non-graphitic carbon that is more likely to produce a graphite structure that has a three-dimensional stacking regularity (for example, more likely to be converted to graphite by a high-temperature treatment around 3300 K under normal pressure).

The negative active material may further include a negative active material besides the non-graphitic carbon. As such other positive active material, various materials conventionally used as a negative active material of a lithium ion secondary battery can be used without particular limitation. Suitable examples include metals such as Si and Sn or semimetals; metal oxides such as Si oxides and Sn oxides or semimetal oxides; polyphosphoric acid compounds; and graphite such as natural graphite and artificial graphite. The content of the negative active material besides the non-graphitic carbon is, for example, appropriately 50% by mass or less, preferably 30% by mass or less, more preferably 20% by mass or less, and further preferably 10% by mass or less of the total mass of the negative active material included in the negative composite layer.

The technique disclosed herein can be preferably implemented in an aspect in which the proportion of the non-graphitic carbon is higher than 90% by mass to the total mass of the negative active material included in the negative composite layer. The proportion of the non-graphitic carbon is more preferably 95% by mass or more, further preferably 98% by mass or more, and particularly preferably 99% by mass or more. Above all, an energy storage device is preferable in which non-graphitic carbon accounts for 100% by mass of the negative active material included in the negative composite layer.

The content of the negative active material in the negative composite layer is not particularly limited, but the lower limit thereof is preferably 50% by mass, more preferably 80% by mass, and further preferably 90% by mass. On the other hand, the upper limit of this content is preferably 99% by mass, and more preferably 98% by mass.

In the case of using the binder in the negative composite layer, the proportion of the binder to the whole negative composite layer can be approximately 0.50% by mass or more and 15% by mass or less, and typically, is preferably 1.0% by mass or more and 10% by mass or less (for example, 1.5% by mass or more and 5.0% by mass or less). In the case of using the thickener in the negative composite layer, the proportion of the thickener to the whole negative composite layer can be approximately 0.10% by mass or more and 10% by mass or less, and typically, is preferably 0.20% by mass or more and 5.0% by mass or less (for example, 0.30% by mass or more and 1.0% by mass or less). In the case of using the filler in the negative composite layer, the proportion of the filler to the whole negative composite layer can be approximately 8.0% by mass or less, and typically, is preferably 5.0% by mass or less (for example, 1.0% by mass or less). The technique disclosed herein can be preferably implemented in an aspect in which the negative composite layer contains no filler mentioned above. In the case of using the conductive agent in the negative composite layer, the proportion of the conductive agent to the whole negative composite layer can be approximately 8.0% by mass or less, and typically, is preferably 5.0% by mass or less (for example, 1.0% by mass or less). The technique disclosed herein can be preferably implemented in an aspect in which the negative composite layer contains no conductive agent mentioned above.

The upper limit of the porosity of the negative composite layer is preferably 45%, and more preferably 40%. On the other hand, the lower limit of the porosity is preferably 25%, and more preferably 30%. The porosity of the negative composite layer within the range mentioned above makes it possible to produce favorable highly filled state and ionic diffusivity in a well-balanced manner.

The lower limit of amount of the negative composite layer stacked (the mass per unit area of the negative composite layer in the negative electrode) is preferably 0.2 g/100 cm$^2$, more preferably 0.3 g/100 cm$^2$, further preferably 0.4 g/100 cm$^2$, and even more preferably 0.5 g/100 cm$^2$. On the other hand, the upper limit of the amount stacked is preferably 3 g/100 cm$^2$, more preferably 2 g/100 cm$^2$, further preferably 1 g/100 cm$^2$, and even more preferably 0.8 g/100 cm$^2$.

The mass (N) per unit area of the negative active material in the positive composite layer is not particularly limited as long as the ratio by mass (N/P) satisfies the range mentioned above, but the lower limit thereof is preferably 0.2 g/100 cm², more preferably 0.3 g/100 cm², further preferably 0.4 g/100 cm², and even more preferably 0.45 g/100 cm². On the other hand, the upper limit of the amount stacked is preferably 3 g/100 cm², more preferably 2 g/100 cm², further preferably 1 g/100 cm², and even more preferably 0.8 g/100 cm².

The upper limit of the ratio (N/P) is 0.45 between the mass (N) per unit area of the negative active material in the negative composite layer and the mass (P) per unit area of the positive active material in the positive composite layer. The ratio by mass (N/P) adjusted to be equal to or less than the above-mentioned upper limit allows the thickness of the negative active material layer to be reduced, thereby reducing the size of the secondary battery itself. Furthermore, in the energy storage device in which the ratio by mass (N/P) is equal to or less than the above-mentioned upper limit, the mass of the negative active material in the negative composite layer is relatively smaller than the mass of the positive active material in the positive composite layer, thereby developing a tendency to increase the insertion of lithium ions per unit mass of the negative active material during charge. Thus, while the negative electrode potential is likely to become electronegative during charge, and thus likely to cause the nonaqueous electrolyte to be reductively decomposed in the negative electrode, the present configuration has PC, DEC, and EMC used in combination to have the specific compositional ratios, thereby making such a disadvantage capable of being eliminated or alleviated. In some aspects, the above-mentioned ratio by mass (N/P) may be, for example, 0.42 or less, and typically 0.40 or less (for example, 0.38 or less). On the other hand, the lower limit of this ratio by mass (N/P) is 0.30. The ratio by mass (N/P) adjusted to be equal to or more than the above-mentioned lower limit allows the negative electrode potential during charge to be prevented from becoming excessively electronegative, thereby more reliably improving the durability. From viewpoints such as improving the durability (for example, the capacity retention ratio after a cycle), the ratio by mass (N/P) is preferably 0.32 or more, more preferably 0.34 or more, and further preferably 0.36 or more. In some aspects, the ratio by mass (N/P) may be, for example, 0.38 or more, and typically 0.40 or more. The technique disclosed herein can be preferably implemented in a mode in which the mass ratio (N/P) is 0.30 or more and 0.45 or less (preferably 0.38 or more and 0.45 or less), for example.

(Separator)

As the material of the separator (first separator and second separator), for example, a woven fabric, a non-woven fabric, a porous resin film, or the like is used. Among these materials, a porous resin film is preferable from the viewpoint of strength, and a non-woven fabric is preferable from the viewpoint of liquid retention for the nonaqueous electrolyte. The main component of the separator is preferably, for example, a polyolefin such as polyethylene or polypropylene from the viewpoint of strength, and is preferably, for example, a polyimide, an aramid, or the like from the viewpoint of resistance to oxidative decomposition. Furthermore, these resins may be combined. In addition, a composite separator including a porous resin film and an inorganic porous layer may be employed.

(Nonaqueous Electrolyte)

The nonaqueous electrolyte includes a nonaqueous solvent and an electrolyte salt dissolved in the nonaqueous solvent.

The nonaqueous solvent includes PC, DEC, and EMC.

The lower limit of the content $C_{PC}$ of PC in the nonaqueous solvent is 25% by volume, and preferably 30% by volume. On the other hand, the upper limit of the content $C_{PC}$ is 55% by volume, and preferably 50% by volume. The content $C_{PC}$ of PC within the range mentioned above makes it possible to enhance the performance improvement effect (for example, the durability improvement effect) of the use in combination with DEC and EMC. In some aspects, the content $C_{PC}$ of PC may be 32% by volume or more, or may be 35% by volume or more. In addition, in some aspects, the content $C_{PC}$ of PC may be 45% by volume or less, or may be 40% by volume or less.

The content $C_{PC}$ of PC may be higher than the content $C_{DEC}$ of DEC. More specifically, $C_{PC} > C_{DEC}$ may be met. Alternatively, the $C_{PC}$ may be lower than the $C_{DEC}$. More specifically, $C_{PC} < C_{DEC}$ may be met. From the viewpoint of better producing the effect of using PC and DEC in combination, the relation between $C_{PC}$ and $C_{DEC}$ preferably satisfies $0.40 \leq (C_{PC}/C_{DEC}) < 3.0$. PC and DEC are used in combination so as to have a specific content ratio, thereby making both improved durability and the effect of suppressing a rise in temperature during overcharge capable of being achieved at higher levels. The technique disclosed herein can be preferably implemented in an aspect in which, for example, the relation between $C_{PC}$ and $C_{DEC}$ meets $0.45 \leq (C_{PC}/C_{DEC}) \leq 2.5$, and more preferably $0.50 \leq (C_{PC}/C_{DEC}) \leq 2.0$. In some aspects, the relation may meet $0.50 \leq (C_{PC}/C_{DEC}) \leq 1.5$, or meet $0.60 \leq (C_{PC}/C_{DEC}) < 1.0$.

The content $C_{PC}$ of PC may be higher than the content $C_{EMC}$ of EMC. More specifically, $C_{PC} > C_{EMC}$ may be met. Alternatively, the $C_{PC}$ may be lower than the $C_{EMC}$. More specifically, $C_{PC} < C_{EMC}$ may be met. From the viewpoint of better producing the effect of using PC and EMC in combination, the relation between $C_{PC}$ and $C_{EMC}$ preferably satisfies $0.75 < (C_{PC}/C_{EMC}) \leq 5.0$. PC and EMC are used in combination so as to have a specific content ratio, thereby making both improved durability and the effect of suppressing a rise in temperature during overcharge capable of being achieved at higher levels. The technique disclosed herein can be preferably implemented in an aspect in which, for example, the relation between $C_{PC}$ and $C_{EMC}$ meets $0.80 \leq (C_{PC}/C_{EMC}) \leq 4.0$, and more preferably $0.85 \leq (C_{PC}/C_{EMC}) \leq 3.0$. In some aspects, the relation may meet $0.85 \leq (C_{PC}/C_{EMC}) \leq 2.0$, or meet $0.85 \leq (C_{PC}/C_{EMC}) \leq 1.5$.

The lower limit of the total content (that is, $C_{DEC}+C_{EMC}$) of DEC and EMC in the nonaqueous solvent is 45% by volume, and preferably 50% by volume. On the other hand, the upper limit of this content is 75% by volume, and preferably 70% by volume. The total content ($C_{DEC}+C_{EMC}$) of DEC and EMC within the range mentioned above allows durability to be enhanced.

The content $C_{DEC}$ of DEC in the nonaqueous solvent is equal to or higher than the content $C_{EMC}$ of EMC. As mentioned above, the content $C_{DEC}$ of DEC is adjusted to be equal to or higher than the content of EMC, thereby allowing the durability to be enhanced.

The lower limit of the content $C_{DEC}$ of DEC in the nonaqueous solvent is preferably 30% by volume, and more preferably 35% by volume. On the other hand, the upper limit of the content $C_{DEC}$ of DEC is preferably 70% by volume, and more preferably 65% by volume. In addition, the lower limit of the content $C_{EMC}$ of EMC in the nonaqueous solvent is preferably 5% by volume, and more preferably 10% by volume. On the other hand, the upper limit of the content $C_{EMC}$ of EMC is preferably 37.5% by volume, and more preferably 35% by volume. In the case where the contents of DEC and EMC fall within the ranges mentioned above, the effects of the present invention are more sufficiently achieved.

From the viewpoint of better producing the effect of using DEC and EMC in combination, the relation between $C_{DEC}$ and $C_{EMC}$ preferably satisfies $1.0 \leq (C_{DEC}/C_{EMC}) \leq 10$. DEC and EMC are used in combination so as to have a specific content ratio, thereby making both improved durability and the effect of suppressing a rise in temperature during overcharge capable of being achieved at higher levels. The technique disclosed herein can be preferably implemented in an aspect in which, for example, the relation between $C_{DEC}$ and $C_{EMC}$ meets $1.0 \leq (C_{DEC}/C_{EMC}) \leq 8.0$, and more preferably $1.0 \leq (C_{DEC}/C_{EMC}) \leq 6.0$. In some aspects, the relation may meet $1.0 \leq (C_{DEC}/C_{EMC}) \leq 4.0$, meet $1.0 \leq (C_{DEC}/C_{EMC}) \leq 2.0$, or meet $1.0 \leq (C_{DEC}/C_{EMC}) \leq 1.2$. The value obtained by subtracting $C_{EMC}$ from $C_{DEC}$ (that is, $C_{DEC}-C_{EMC}$) is preferably less than 70% by volume, more preferably 60% by volume or less, and further preferably 50% by volume or less. For example, $C_{DEC}-C_{EMC}$ may be 30% by volume or less.

The lower limit of the total content (that is, $C_{PC}+C_{DEC}+C_{EMC}$) of PC, DEC, and EMC in the nonaqueous solvent is preferably 80% by volume, preferably 90% by volume, more preferably 99% by volume, and further preferably 99.9% by volume. On the other hand, the upper limit of this total content ($C_{PC}+C_{DEC}+C_{EMC}$) may be 100% by volume. As mentioned above, the effects of the present invention are more sufficiently achieved by the nonaqueous solvent consisting substantially of the three components of PC, DEC, and EMC.

The nonaqueous solvent may further contain other nonaqueous solvents besides PC, DEC, and EMC. Examples of the other nonaqueous solvents include cyclic carbonates such as ethylene carbonate (EC) and butylene carbonate, chain carbonates such as dimethyl carbonate (DMC), esters, ethers, amides, sulfones, lactones, and nitriles. In the case where the nonaqueous solvent includes EC, the content $C_{EC}$ of EC in the nonaqueous solvent is preferably lower than the content $C_{PC}$ of PC ($C_{EC}<C_{PC}$). The content $C_{EC}$ of EC is, for example, less than 25% by volume, preferably 15% by volume or less, more preferably 10% by volume or less, and further preferably 5% by volume or less. The technique disclosed herein can be preferably implemented in an aspect in which the nonaqueous solvent includes no EC. In the case where the nonaqueous solvent includes DMC, the content $C_{DMC}$ of DMC in the nonaqueous solvent is preferably lower than the content $C_{DEC}$ of DEC ($C_{DMC}<C_{DEC}$). The content $C_{DMC}$ of DMC is, for example, less than 35% by volume, preferably 25% by volume or less, more preferably 15% by volume or less, and further preferably 5% by volume or less. The technique disclosed herein can be preferably implemented in an aspect in which the nonaqueous solvent includes no DMC. The technique disclosed herein can be implemented in an aspect in which no any other nonaqueous solvent is included besides PC, DEC, and EMC.

As the electrolyte salt, known electrolyte salts can be used, which are typically used as electrolyte salts of nonaqueous electrolytes for common energy storage devices. Examples of the electrolyte salt mentioned above include lithium salts, sodium salts, potassium salts, magnesium salts, and onium salts, and the lithium salts are preferable.

Examples of the lithium salt include inorganic lithium salts such as $LiPF_6$, $LiPO_2F_2$, $LiBF_4$, $LiClO_4$, and $LiN(SO_2F)_2$, and lithium salts having a fluorinated hydrocarbon group, such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, and $LiC(SO_2C_2F_5)_3$. Among these salts, inorganic lithium salts are preferable, and $LiPF_6$ is more preferable.

The lower limit of the content of the electrolyte salt in the nonaqueous electrolyte is preferably 0.1 mol/L, more preferably 0.5 mol/L, further preferably 1 mol/L, and particularly preferably 1.2 mol/L. On the other hand, the upper limit of this content is not particularly limited, but is preferably 2.5 mol/L, more preferably 2 mol/L, and further preferably 1.5 mol/L.

The energy storage device according to one embodiment of the present invention is a nonaqueous electrolyte energy storage device in which the mass (N) per unit area of the negative active material containing non-graphitic carbon is relatively small, that is, the ratio (N/P) is small, while the device has excellent durability and a suppressed rise in temperature during overcharge. More specifically, although the energy storage device is designed such that the potential of the negative electrode is likely to become electronegative during charge, the device has excellent durability and a high capacity retention ratio after a charge-discharge cycle. For this reason, a usage method including charge performed until the potential of the negative electrode reaches, for example, 0.01 V (vs. Li/Li$^+$) or lower can be suitably employed for the energy storage device. It is to be noted that the lower limit of the potential of the negative electrode at the end of the charge in the usage method mentioned above may be, for example, 0.001 V (vs. Li/Li$^+$). Furthermore, the energy storage device is designed such that the mass (N) per unit area of the negative active material is relatively small, that is, the negative composite layer is relatively thin, thus making it possible to reduce the size of the energy storage device. Furthermore, for the energy storage device, the rise in temperature during overcharge is suppressed by the nonaqueous solvent including DEC and EMC in accordance with the specific compositional ratio. For this reason, the energy storage device in which quality deterioration with overcharge is suppressed is also excellent in reliability and safety. The energy storage device can be used as a power source for a personal computer, an electronic device such as a communication terminal, an automobile, or the like, and particularly suitably as a power source for an automobile.

(Method for Manufacturing Nonaqueous Electrolyte Energy Storage Device)

The method for manufacturing the energy storage device is not particularly limited, and can be achieved by known methods in combination. The manufacturing method includes, for example, a step of preparing a positive electrode and a negative electrode, a step of preparing a nonaqueous electrolyte, a step of forming an electrode assembly with the positive electrode and the negative electrode alternated by stacking or winding the electrodes with a separator interposed therebetween, a step of housing the positive electrode and the negative electrode (electrode assembly) in a battery case, and a step of injecting the nonaqueous electrolyte into the battery case. The injection can be performed by a known method. After the injection, the injection port is sealed, thereby allowing a nonaqueous electrolyte secondary battery (energy storage device) to be obtained.

Further, the positive electrode and the negative electrode can be manufactured by a conventionally known method. Specifically, for example, in the case of the positive electrode, the electrode can be obtained by stacking a positive composite layer directly on a positive electrode substrate or with an intermediate layer interposed therebetween. The positive composite layer can be stacked by coating with a material for positive composite layer formation (positive composite). The material for positive composite layer formation is typically a paste including respective components for the positive composite layer and a dispersion medium (solvent). As the dispersion medium, water or an organic solvent such as N-methylpyrrolidone (NMP) may be appropriately selected and used. The coating of the material for positive composite layer formation can be performed by a known method. Typically, after the coating, the coating film is dried to volatilize the dispersion medium. Thereafter, the coating film can be pressed in the thickness direction. The above-mentioned press can be performed, for example, with the use of a known apparatus such as a roll press. Also in the case of the negative electrode, the electrode can be manufactured similarly to the positive electrode.

<Energy Storage Apparatus>

An energy storage apparatus according to an embodiment of the present invention includes the above-described energy storage device according to an embodiment of the present invention, a detection unit, and a control unit.

The detection unit detects the voltage between the positive electrode and negative electrode of the energy storage device. Conventionally known voltmeters, voltages sensor, and the like can be used for the detection unit.

The control unit is electrically connected to the detection unit, and configured to stop the energy storage device from charged with electricity when the voltage detected by the detection unit is equal to or higher than a predetermined value. For example, the control unit can be configured to, in the case of charge with the use of a charger, cut off the electrical connection between the charger and the energy storage device when the voltage becomes equal to or higher than a predetermined value. Further, the control unit can be configured with a computer and a computer program. In addition, the control unit may be partially or entirely configured with a processor including a semiconductor chip.

In the energy storage apparatus according to an embodiment of the present invention, the potential of the negative electrode is 0.01 V (vs. Li/Li$^+$) or lower when the voltage of the energy storage device is the predetermined value. More specifically, the potential of the negative electrode at which charge is stopped is 0.01 V (vs. Li/Li$^+$) or lower. As described above, the energy storage apparatus is designed such that the potential of the negative electrode reaches an electronegative potential during charge, but because of the use of the nonaqueous electrolyte energy storage device, the apparatus has excellent durability, and also has a suppressed rise in temperature during overcharge. In addition, the energy storage apparatus is designed such that the potential of the negative electrode at which charge is stopped is 0.01 V (vs. Li/Li$^+$) or lower, and wide in potential range for using the negative active material, thus allowing the electric capacity to be increased.

In the energy storage apparatus according to an embodiment of the present invention, the upper limit of the potential of the negative electrode at which the control unit stops the energy storage device from being charged with electricity is 0.01 V (vs. Li/Li$^+$), but may be preferably 0.008 V (vs. Li/Li$^+$), or may be more preferably 0.006 V (vs. Li/Li$^+$). The potential of the negative electrode is equal to or lower than the upper limit mentioned above, thereby the utilization factor of the negative electrode to be increased, and then allowing the electric capacity to be increased. On the other hand, the lower limit of the potential of the negative electrode in this case is not particularly limited, but is preferably 0.001 V (vs. Li/Li$^+$), more preferably 0.002 V (vs. Li/Li$^+$), and may be more preferably 0.004 V (vs. Li/Li$^+$). This negative electrode potential is equal to or higher than the lower limit mentioned above, thereby allowing the durability to be further enhanced.

The energy storage apparatus can be used as a power supply device for a personal computer, an electronic device such as a communication terminal, an automobile, or the like, and particularly suitably as a power supply device for an automobile.

OTHER EMBODIMENTS

The present invention is not to be considered limited to the embodiment mentioned above, and can be implemented in various modified and improved aspects besides the aspects mentioned above. For example, although an embodiment of the nonaqueous electrolyte energy storage device that is a nonaqueous electrolyte secondary battery has been mainly described in the embodiment mentioned above, other nonaqueous electrolyte energy storage devices may be adopted. Other nonaqueous electrolyte energy storage devices include capacitors (electric double layer capacitors, lithium ion capacitors). Furthermore, the energy storage device and the energy storage apparatus including the energy storage device according to the present invention may be used for charge-discharge in a range in which the negative electrode potential at the end of the charge exceeds 0.01 V (vs. Li/Li$^+$).

FIG. 1 shows a schematic diagram of a rectangular nonaqueous electrolyte secondary battery 1 that is an embodiment of the nonaqueous electrolyte energy storage device according to the present invention. It is to be noted that the figure is a diagram of the inside seen through a battery case. The nonaqueous electrolyte secondary battery 1 shown in FIG. 1 has an electrode assembly 2 housed in a battery case 3. The electrode assembly 2 is formed by winding a positive electrode including a positive active material and a negative electrode including a negative active material with a separator interposed therebetween. The positive electrode is electrically connected to a positive electrode terminal 4 through a positive electrode lead 4', and the negative electrode is electrically connected to a negative electrode terminal 5 through a negative electrode lead 5'.

Figure 2:
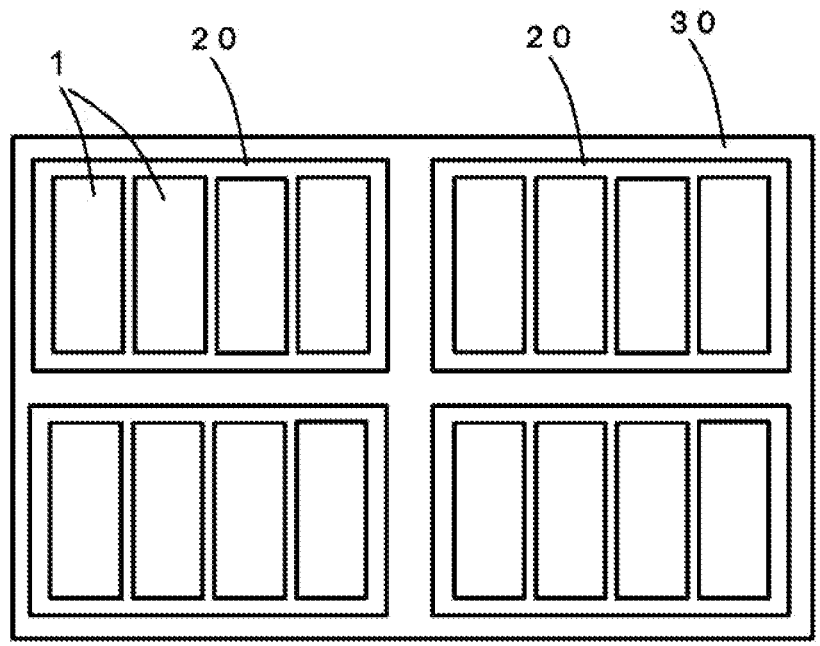
FIG. 2 is a schematic diagram illustrating an energy storage apparatus configured by assembling a plurality of nonaqueous electrolyte secondary batteries according to an embodiment of a nonaqueous electrolyte energy storage device according to the present invention.

The configuration of the nonaqueous electrolyte energy storage device according to the present invention is not to be considered particularly limited, and examples thereof include a cylindrical energy storage device, a prismatic energy storage device (rectangular energy storage device), and a flattened energy storage device. The present invention can be also achieved as an energy storage apparatus including the multiple energy storage devices mentioned above. One embodiment of the energy storage apparatus is shown in FIG. 2. In FIG. 2, the energy storage apparatus 30 includes a plurality of energy storage units 20. Each of the energy storage units 20 includes a plurality of nonaqueous electrolyte secondary batteries 1. The above-mentioned energy storage apparatus 30 can be mounted as a power source for vehicles such as electric vehicles (EV), hybrid vehicles (HEV), and plug-in hybrid vehicles (PHEV).

EXAMPLES

The present invention will be more specifically described below with reference to examples but the present invention is not to be considered limited to the following examples.

Example 1

(Preparation of Positive Electrode)

With the use of $LiNi_{3/5}Co_{1/5}Mn_{1/5}O_2$ (NCM622) as a positive active material (AM), acetylene black (AB) as a conductive agent, and polyvinylidene fluoride as a binder (bin) at ratios by mass of 94:4:2, a positive composite paste with N-methylpyrrolidone as a dispersion medium was prepared. This positive composite paste was applied to each side of aluminum foil (0.015 mm in thickness) as a positive electrode substrate to reach 1.73 g/100 cm² in coating mass (solid content), and dried to prepare a positive composite layer. Thereafter, the layer was pressed, thereby providing a positive electrode. The porosity of the positive composite layer of the obtained positive electrode was 30%. The whole thickness (the total thickness of the thickness of the positive electrode substrate; and the thickness of the positive composite layers at the both surfaces) of the positive electrode was 0.128 mm. The mass (P) per unit area of the positive active material in the positive electrode was 1.63 g/100 cm² (1.73 g/100 cm²×0.94).

(Preparation of Negative Electrode)

Hard carbon as a negative active material (AM), a styrene-butadiene rubber (SBR) as a binder, and carboxymethyl cellulose (CMC) as a thickener were used at ratios by mass of 96:3.5:0.5 to prepare a negative composite paste with water as a dispersion medium. This negative composite paste was applied to each side of copper foil (0.008 mm in thickness) as a negative electrode substrate to reach 0.504 g/100 cm² in coating mass (solid content), and dried to prepare a negative composite layer. Thereafter, the layer was pressed, thereby providing a negative electrode. The porosity of the negative composite layer of the obtained negative electrode was 35%. The whole thickness (the total thickness of the thickness of the negative electrode substrate; and the thickness of the negative composite layers at the both surfaces) of the negative electrode was 0.114 mm. The mass (N) per unit area of the negative active material in the negative electrode was 0.483 g/100 cm² (0.504 g/100 cm²× 0.96). The ratio (N/P) of the mass (N) per unit area of the negative active material in the negative electrode and the mass (P) per unit area of the positive active material in the positive electrode was 0.30{(0.483 g/100 cm²)/(1.73 g/100 cm²)}.

(Method for Manufacturing Battery)

The positive electrode and the negative electrode were wound with a polyethylene separator interposed therebetween to obtain an electrode assembly with the positive electrode and the negative electrode wound. Also prepared was a nonaqueous electrolyte in which $LiPF_6$ was dissolved to reach 1.2 mol/L in a nonaqueous solvent of PC, EMC, and DEC mixed at volume ratios of 30:35:35. A secondary battery (nonaqueous electrolyte energy storage device) of Example 1 was prepared with the use of the electrode assembly and nonaqueous electrolyte mentioned above.

Examples 2 to 12, Comparative Examples 1 to 18

Respective positive electrodes and negative electrodes according to Examples 2 to 12 and Comparative Example 1 to 18 were prepared similarly to Example 1 except for the type of the positive active material, the coating mass of the positive composite paste, and the coating mass of the negative composite paste as listed in Table 1. It is to be noted that Table 1 shows together the ratio (N/P) in the obtained positive electrode and negative electrode, the whole thickness of the positive electrode, and the whole thickness of the negative electrode.

In addition, the type of the positive active materials in the table represent the following respective positive active materials.

NCM622: $LiNi_{3/5}Co_{1/5}Mn_{1/5}O_2$
NCM111: $LiNi_{1/3}Co_{1/3}Mn_{1/3}O_2$
NCM811: $LiNi_{8/10}Co_{1/10}Mn_{1/10}O_2$

Then, respective secondary batteries (nonaqueous electrolyte energy storage devices) according to Examples 2 to 12 and Comparative Examples 1 to 18 were prepared similarly to Example 1 except for the use of these positive electrodes and negative electrodes, and the employment of the nonaqueous solvent compositions listed in Tables 2 to 7. Tables 2 to 7 together show the type of the positive active material used and ratio (N/P). In addition, in Tables 2 to 7, for comparison, some of the examples and comparative examples are duplicated.

(Capacity Retention Ratio: Durability)

Each of the secondary batteries according to Examples 1 to 12 and Comparative Examples 1 to 18 was charged up to an SOC of 100% at a charge current of 0.5 C in a constant temperature bath at 60° C., and then subjected to 1,000 cycles of charge-discharge cycle test for discharge at a discharge current of 1.0 C. It is to be noted that "1 C" refers to a current value corresponding to the same quantity of electricity as the nominal capacity of the battery in the case where the battery is energized with a constant current for 1 hour. The ratio of the discharge capacity after the charge-discharge cycle test to the discharge capacity before the charge-discharge cycle test was determined as a capacity retention ratio. The results are shown in Tables 2 to 7. Table 2 also shows the negative electrode potentials at 100% SOC in Examples 1 to 5 and Comparative Examples 1 to 9.

(SOC During Temperature Rise: Suppression of Temperature Rise During Overcharge)

Each of the secondary batteries according to Examples 2 and 8 to 10 and Comparative Examples 14 to 18 was evaluated by the following method for suppression of temperature rise with overcharge. The secondary battery was charged with electricity in a constant temperature bath at 25° C. under the conditions of charge current: 27 A and unlimited charge voltage, and the SOC was measured when the surface temperature of the secondary battery reached 100° C. As measurement results, Table 6 shows relative values with the SOC in Example 2 as a reference (100%).

|  |  | Comparative Example 1, 3 | Example 1 Comparative Example 4 | Example 2, 6-10 Comparative Example 5, 10-18 | Example 3 Comparative Example 6 | Example 4 Comparative Example 7 | Example 5 Comparative Example 8 | Comparative Example 2, 9 | Example 11 | Example 12 |
|---|---|---|---|---|---|---|---|---|---|---|
|  | Ratio (N/P) | 0.28 | 0.30 | 0.32 | 0.36 | 0.40 | 0.45 | 0.51 | 0.30 | 0.36 |
| Positive Electrode | Type of Positive Active Material | NCM622 | NCM622 | NCM622 | NCM62% | NCM622 | NCM622 | NCM62% | NCM111 | NCM811 |

-continued

|  |  | Comparative Example 1, 3 | Example 1 Comparative Example 4 | Example 2, 6-10 Comparative Example 5, 10-18 | Example 3 Comparative Example 6 | Example 4 Comparative Example 7 | Example 5 Comparative Example 8 | Comparative Example 2, 9 | Example 11 | Example 12 |
|---|---|---|---|---|---|---|---|---|---|---|
|  | Composite Composition (AM/AB/bin) | 94/4/2 | 94/4/2 | 94/4/2 | 94/4/2 | 94/4/2 | 94/4/2 | 94/4/2 | 94/4/2 | 94/4/2 |
|  | Coating Mass [g/100 cm$^2$] | 1.73 | 1.73 | 1.73 | 1.73 | 1.73 | 1.73 | 1.73 | 1.88 | 1.56 |
|  | Whole Thickness [mm] | 0.128 | 0.128 | 0.128 | 0.128 | 0.128 | 0.128 | 0.128 | 0.137 | 0.116 |
| Negative Electrode | Composite Composition (AM/SBR/CMC) | 96/3.5/0.5 | 96/3.5/0.5 | 96/3.5/0.5 | 96/3.5/0.5 | 96/3.5/0.5 | 96/3.5/0.5 | 96/3.5/0.5 | 96/3.5/0.5 | 96/3.5/0.5 |
|  | Coating Mass [9/100 cm$^2$] | 0.483 | 0.504 | 0.551 | 0.607 | 0.676 | 0.762 | 0.866 | 0.551 | 0.551 |
|  | Whole Thickness [mm] | 0.110 | 0.114 | 0.124 | 0.136 | 0.151 | 0.168 | 0.190 | 0.124 | 0.124 |

TABLE 2

|  | Type of Positive Active Material | Ratio (N/P) | PC [Vol %] | DMC [Vol %] | EMC [Vol %] | DEC [Vol %] | Capacity Retention Ratio [%] | Negative Electrode [V(vs.Li/Li$^+$)] |
|---|---|---|---|---|---|---|---|---|
| Comparative Example 1 | NCM622 | 0.28 | 30 | 0 | 35 | 85 | 48 | 0.001 |
| Example 1 | NCM622 | 0.30 | 30 | 0 | 35 | 35 | 71 | 0.002 |
| Example 2 | NCM622 | 0.32 | 30 | 0 | 35 | 35 | 73 | 0.005 |
| Example 3 | NCM622 | 0.36 | 30 | 0 | 35 | 35 | 73 | 0.007 |
| Example 4 | NCM622 | 0.40 | 30 | 0 | 85 | 35 | 76 | 0.008 |
| Example 5 | NCM622 | 0.45 | 30 | 0 | 35 | 35 | 79 | 0.009 |
| Comparative Example 2 | NCM622 | 0.51 | 30 | 0 | 35 | 35 | 80 | 0.012 |
| Comparative Example 3 | NCM622 | 0.28 | 30 | 35 | 35 | 0 | 46 | 0.001 |
| Comparative Example 4 | NCM622 | 0.30 | 30 | 35 | 35 | 0 | 52 | 0.002 |
| Comparative Example 5 | NCM622 | 0.32 | 30 | 35 | 35 | 0 | 56 | 0.005 |
| Comparative Example 6 | NCM622 | 0.36 | 30 | 35 | 35 | 0 | 61 | 0.007 |
| Comparative Example 7 | NCM622 | 0.40 | 30 | 35 | 35 | 0 | 63 | 0.008 |
| Comparative Example 8 | NCM622 | 0.45 | 30 | 35 | 35 | 0 | 65 | 0.009 |
| Comparative Example 9 | NCM622 | 0.51 | 30 | 35 | 35 | 0 | 81 | 0.012 |

TABLE 3

|  | Type of Positive Active Material | Ratio (N/P) | PC [Vol %] | EC [Vol %] | EMC [Vol %] | DEC [Vol %] | Capacity Retention Ratio [%] |
|---|---|---|---|---|---|---|---|
| Example 2 | NCM622 | 0.32 | 30 | 0 | 35 | 35 | 73 |
| Comparative Example 10 | NCM622 | 0.32 | 0 | 30 | 35 | 35 | 66 |

TABLE 4

| | Type of Positive Active Material | Ratio (N/P) | PC [Vol%] | DMC [Vol %] | EMC [Vol %] | DEC [Vol %] | Capacity Retention Ratio [%] |
|---|---|---|---|---|---|---|---|
| Example 2 | NCM662 | 0.32 | 30 | 0 | 35 | 35 | 73 |
| Comparative Example 5 | NCM662 | 0.32 | 30 | 35 | 35 | 0 | 56 |
| Comparative Example 11 | NCM662 | 0.32 | 30 | 35 | 0 | 35 | 59 |

TABLE 5

| | Type of Positive Active Material | Ratio (N/P) | PC [Vol %] | EMC [Vol %] | DEC [Vol%] | Capacity Retention Ratio [%] |
|---|---|---|---|---|---|---|
| Comparative Example 12 | NCM662 | 0.32 | 20 | 40 | 40 | 58 |
| Example 2 | NCM662 | 0.32 | 30 | 35 | 35 | 73 |
| Example 6 | NCM662 | 0.32 | 40 | 30 | 30 | 72 |
| Example 7 | NCM662 | 0.32 | 50 | 25 | 25 | 72 |
| Comparative Example 13 | NCM662 | 0.32 | 60 | 20 | 20 | 60 |

TABLE 6

| | Type of Positive Active Material | Ratio (N/P) | PC [Vol %] | EMC [Vol%] | DEC [Vol %] | Capacity Retention Ratio [%] | SOC during Temperature Rise (Relative Value) [%] |
|---|---|---|---|---|---|---|---|
| Comparative Example 14 | NCM662 | 0.32 | 30 | 70 | 0 | 61 | 98 |
| Comparative Example 15 | NCM662 | 0.32 | 30 | 60 | 10 | 62 | 97 |
| Comparative Example 16 | NCM662 | 0.32 | 30 | 50 | 20 | 62 | 98 |
| Comparative Example 17 | NCM662 | 0.32 | 30 | 40 | 30 | 64 | 99 |
| Example 2 | NCM662 | 0.32 | 30 | 35 | 35 | 73 | 100 |
| Example 8 | NCM662 | 0.32 | 30 | 30 | 40 | 72 | 97 |
| Example 9 | NCM662 | 0.32 | 30 | 20 | 50 | 75 | 99 |
| Example 10 | NCM662 | 0.32 | 30 | 10 | 60 | 74 | 96 |
| Comparative Example 18 | NCM662 | 0.32 | 30 | 0 | 70 | 75 | 76 |

TABLE 7

| | Type of Positive Active Material | Ratio (N/P) | PC [Vol %] | EMC [Vol %] | DEC [Vol%] | Capacity Retention Ratio [%] |
|---|---|---|---|---|---|---|
| Example 2 | NCM662 | 0.32 | 30 | 35 | 35 | 73 |
| Example 11 | NCM111 | 0.30 | 30 | 35 | 35 | 76 |
| Example 12 | NCM811 | 0.36 | 30 | 35 | 35 | 72 |

As shown in Table 1, in Examples 1 to 12 and Comparative Examples 1, 3 to 8, and 10 to 18 with the ratio (N/P) of 0.45 or less, the negative composite layer can be provided thinly, thereby making it possible to reduce the size of the secondary battery itself. In addition, as shown in Table 2, in Comparative Examples 3 to 9 with PC, DMC and EMC used as the nonaqueous solvent, the capacity retention ratio is significantly decreased as the ratio (N/P) is reduced. This is presumed to be due to, e.g., the fact that the negative electrode potential at the end of the charge becomes electronegative, thereby making the nonaqueous electrolyte more likely to be reductively decomposed. In contrast, it is determined that in Examples 1 to 5 with PC, EMC, and DEC used as the nonaqueous solvent and with the ratio (N/P) in the range of 0.30 or more and 0.45 or less, the capacity retention ratio is high in spite of the relatively small ratio (N/P), and thus excellent in durability.

As shown in Table 3, Comparative Example 10 with EC used instead of PC as the cyclic carbonate has a low capacity retention ratio. In addition, as shown in Table 4, Comparative Examples 5 and 11 with DMC used instead of EMC or DEC as the chain carbonate have low capacity retention ratios. From the foregoing, it is determined that the effect of increasing the capacity retention ratio, that is, improving the durability is an effect that is produced only in the case where PC, DMC, and EMC are combined.

Table 5 shows examples and comparative examples of varying the mixing ratios of PC, EMC and DEC. It is determined that Examples 2, 6 and 7 in which the content of PC is 25% by volume or more and 55% by volume or less, whereas the total content of EMC and DEC is 45% by volume or more and 75% by volume or less are high in capacity retention ratio.

Table 6 shows examples and comparative examples of varying the mixing ratios of EMC and DEC. Comparative Example 18 including no EMC was low in SOC during the temperature rise, with the result that the temperature was likely to rise with overcharge. In contrast, it is determined that the temperature rise during overcharge can be suppressed by mixing EMC as in Examples 2 and 8 to 10. Furthermore, it is determined that the capacity retention ratio is increased by making the content of DEC equal to or higher than the content of EMC.

Table 7 shows examples of using different positive active materials. It is determined that the capacity retention ratio is increased by using PC, EMC, and DEC, regardless of the type of the positive active material.

INDUSTRIAL APPLICABILITY

The present invention can be applied to nonaqueous electrolyte energy storage devices for use as power sources for personal computers, electronic devices such as communication terminals, automobiles, and the like.

DESCRIPTION OF REFERENCE SIGNS

1: Nonaqueous electrolyte secondary battery
2: Electrode assembly
3: Battery case
4: Positive electrode terminal
4': Positive electrode lead
5: Negative electrode terminal
5': Negative electrode lead
20: Energy storage unit
30: Energy storage apparatus

The invention claimed is:

1. A nonaqueous electrolyte energy storage device comprising:
   a positive electrode having a positive composite layer including a positive active material;
   a negative electrode having a negative composite layer including a negative active material; and
   a nonaqueous electrolyte including a nonaqueous solvent,
   wherein the positive active material includes a lithium-transition metal composite oxide that contains nickel as a transition metal and has a layered α-NaFeO$_2$-type crystal structure,
   the lithium-transition metal composite oxide is represented by LiNi$_a$Co$_b$Mn$_c$M$_d$O$_e$ where M is at least one transition metal other than Ni, Co, and Mn, a+b+c+d=1, 0.3≤a≤0.9, 0.05≤b≤0.4, 0.05≤c≤0.4, 0≤d≤1, and 1.7≤e≤2.3,
   the negative active material contains non-graphitic carbon including non-graphitizable carbon,
   a content of the non-graphitic carbon is higher than 90% by mass to the total mass of the negative active material included in the negative composite layer,
   a ratio (N/P) between mass (N) per unit area of the negative active material in the negative composite layer and mass (P) per unit area of the positive active material in the positive composite layer is 0.30 or more and 0.45 or less,
   the nonaqueous solvent contains a propylene carbonate, a diethyl carbonate, and an ethyl methyl carbonate,
   a content of the propylene carbonate in the nonaqueous solvent is 25% by volume or more and 55% by volume or less,
   a total content of the diethyl carbonate and the ethyl methyl carbonate in the nonaqueous solvent is 45% by volume or more and 75% by volume or less, and
   a content of the diethyl carbonate is equal to or higher than the content of the ethyl methyl carbonate.

2. The nonaqueous electrolyte energy storage device according to claim 1, wherein the positive electrode and the negative electrode are wound.

3. An energy storage apparatus comprising:
   the energy storage device according to claim 1;
   a detection unit configured to detect a voltage of the energy storage device; and
   a control unit electrically connected to the detection unit, and configured to stop the energy storage device from being charged with electricity when the voltage is equal to or higher than a predetermined value,
   wherein the negative electrode has a potential of 0.01 V (vs. Li/Li$^+$) or lower when the voltage of the energy storage device is the predetermined value.

4. The nonaqueous electrolyte energy storage device according to claim 1, wherein
   a content of the non-graphitizable carbon is 100% by mass to the total mass of the negative active material included in the negative composite layer, and
   a content of the lithium-transition metal composite oxide is 100% by mass to the total mass of the positive active material included in the positive composite layer.

* * * * *